United State
Eberhardt et al.

[11] 4,043,636
[45] Aug. 23, 1977

[54] ILLUMINATION-PANEL FOR LIQUID CRYSTAL DISPLAY OF SIMILAR DEVICE

[75] Inventors: Noel H. Eberhardt, Cupertino; Ron F. Keller, Aptos, both of Calif.

[73] Assignee: Intel Corporation, Santa Clara, Calif.

[21] Appl. No.: 600,979

[22] Filed: Aug. 1, 1975

Related U.S. Application Data

[63] Continuation-in-part of Ser. No. 535,188, Dec. 23, 1974, abandoned.

[51] Int. Cl.² .............................................. G02F 1/13
[52] U.S. Cl. ............................... 350/160 LC; 350/188
[58] Field of Search ................. 350/127, 160 LC, 188, 350/259

[56] References Cited
U.S. PATENT DOCUMENTS

| | | | |
|---|---|---|---|
| 3,213,751 | 10/1965 | Benjamin et al. | 350/127 X |
| 3,840,695 | 10/1974 | Fischer | 350/160 LC X |
| 3,864,905 | 2/1975 | Richardson | 350/160 LC X |
| 3,881,809 | 5/1975 | Fergason et al. | 350/160 LC |

Primary Examiner—Edward S. Bauer
Attorney, Agent, or Firm—Spensley, Horn & Lubitz

[57] ABSTRACT

An illumination panel for the enhancement of image brightness of a liquid crystal display for a watch or similar device is disclosed. The panel has an internal light source with a suitably shaped and reflectorized coating to substantially direct internal and external light in the desired direction. More particularly, a transparent layer or member with an internal light source mounted at one end is selectively coated with a metallic reflecting material to reflect light from the internal source and from external sources through a cross-hatched surface or a matte finished window on the surface of the member. The window may be defined by the reflectorized coating. The member is mounted adjacent to the exterior surface of the bottom substrate of the liquid crystal display. Diffused light is transmitted from the internal light source of the illumination panel through the bottom substrate of the display.

5 Claims, 10 Drawing Figures

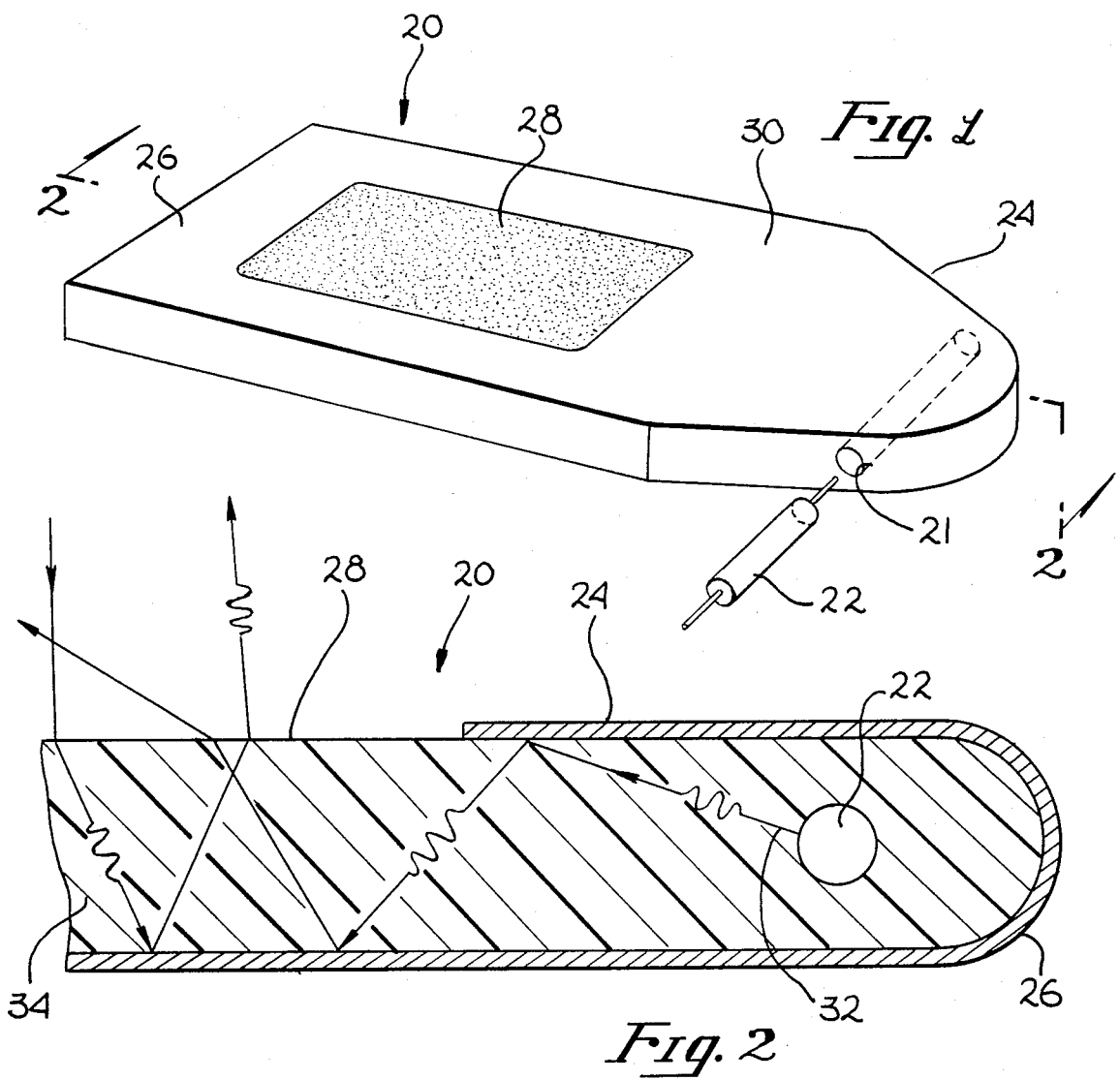
Fig. 1
Fig. 2
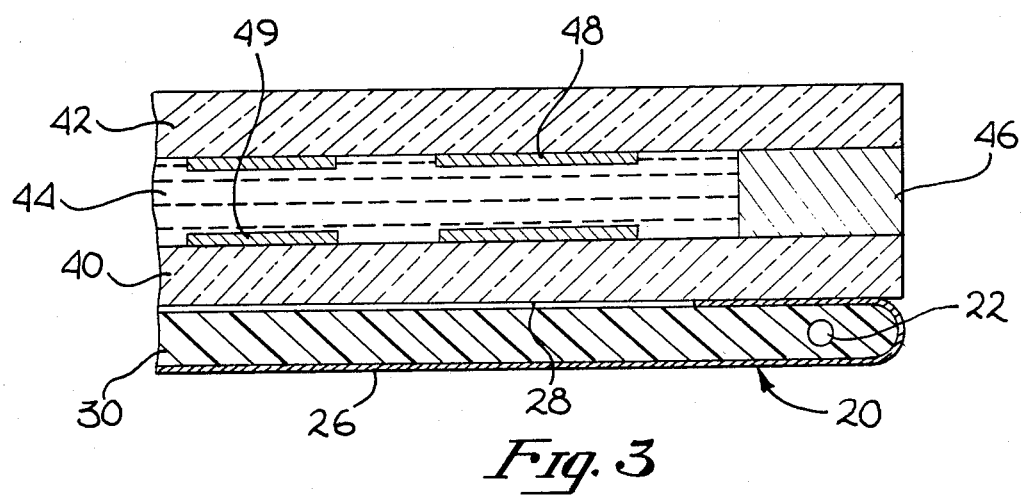
Fig. 3

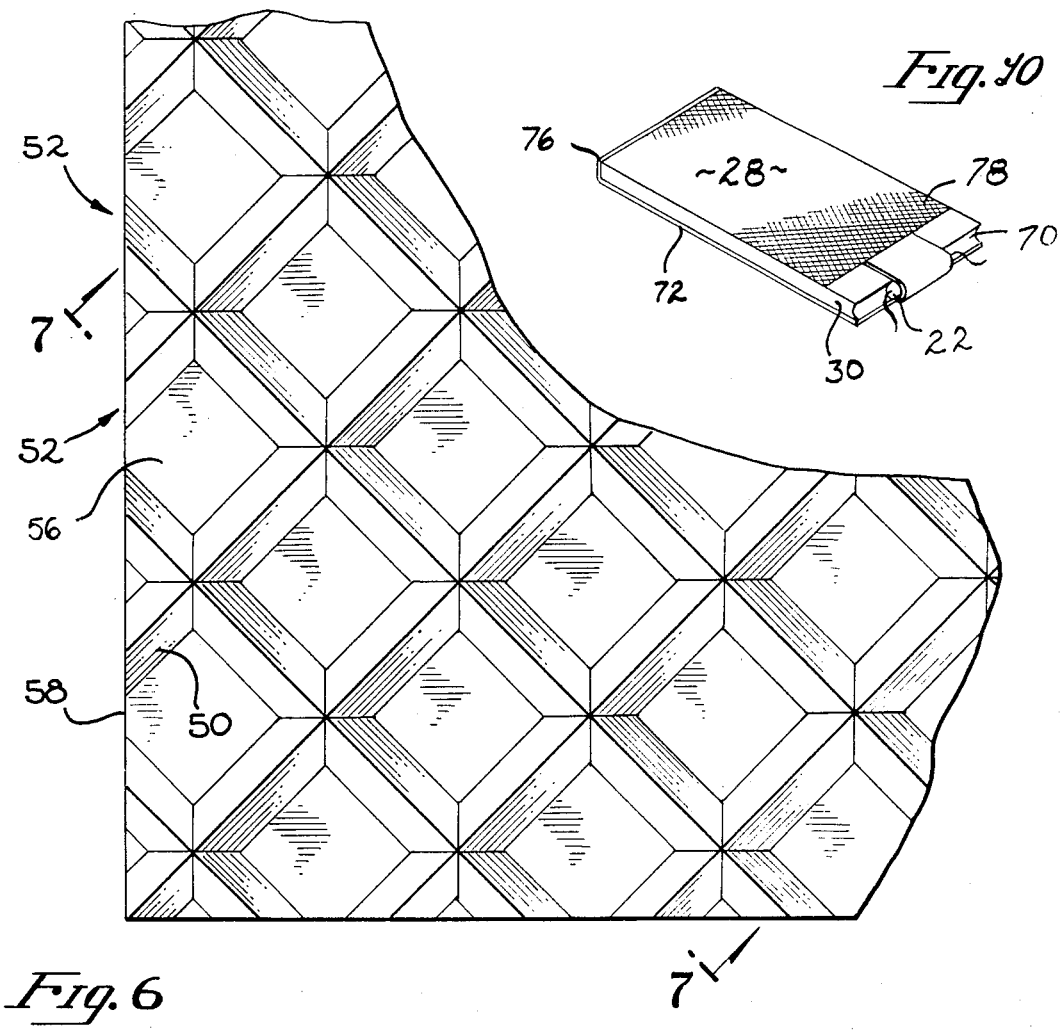
Fig. 6
Fig. 10
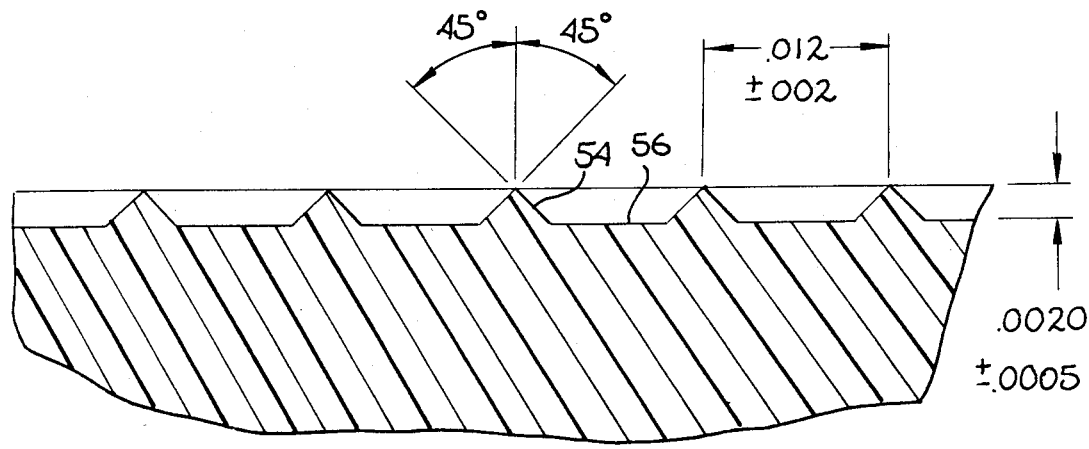
Fig. 7

ILLUMINATION-PANEL FOR LIQUID CRYSTAL DISPLAY OF SIMILAR DEVICE

The present application is a Continuation in Part Application of a present Application of the same inventors and assigned to the same assignee of the present patent, which parent Application was filed on Dec. 23, 1974, Ser. No. 535,188, and which is now abandoned.

BACKGROUND OF THE INVENTION

1. Field of the Invention

The present invention relates to the field of brightness enhancement for liquid crystal displays for watches and similar devices.

2. Description of the Prior Art

The operation of liquid crystal display devices has typically been based upon the physical principle that the liquid crystalline substance suffers a change of state upon application of a suitable electric potential. Upon application of a voltage across the liquid crystalline substance, which voltage is equal to or greater than the threshold voltage for the particular liquid crystalline substance and device design, the substance will change to an "excited" state. In the excited state the liquid crystalline substance has a greater optical coefficient of scattering than the "unexcited" portions of the liquid crystalline substances. The differential in the optical coefficient of scattering between the "excited and unexcited" states can then be exploited to form alphanumeric displays suitable for miniaturized optical displays, such as digital watch display. Displays displaying this principle are commonly referred to as dynamic scattered liquid crystals displays. The subject invention may also be applied to liquid crystal displays employing different principles (e.g., field effect) and passive (non-radiating) displays (e.g., electrochromic). For purposes of clarity the detailed description is directed to liquid crystal displays of the dynamic scattering type.

Since the basis of operation for a liquid crystal display is derived from the change of state of a passive optical characteristic of the liquid crystal substance, and involves no release of optical energy, it is necessary in some circumstances to employ an independent light source in order to conveniently see the change of state. The possible modes of illumination of the liquid crystalline substance are divided into two basic groups, a transmissive mode and a reflective mode. In the transmission mode the liquid crystalline layer is positioned between the light source and the observer. In the reflective mode the observer and the light source are positioned on the same side of the liquid crystalline layer. The transmissive mode is shown in U.S. Pat. No. 3,540,796, FIGS. 2 and 3. In that patent, the observer's line of sight is substantially perpendicular to the plane of the display read out. Light from the light source appears to uniformly brighten the plane of the display read out. When portions of the liquid crystalline substance are selectively "excited" those portions preferentially scatter the light to a greater degree than "unexcited" portions. The desired display appears as darkened regions in a brightly illuminated field.

Alternatively, in one type of reflective mode device, light is directed from an exterior light source through the plane of the display read out and the liquid crystalline substance. The light is then typically absorbed in a darkened back plate. In such a device the display read out appears uniformly darkened. Selective excitation of a portion of the liquid crystalline substance scatters the incident light to a greater degree. This causes those portions to appear as brightened regions in a uniformly darkened background. However, the brightness of the image in such a device depends both upon the magnitude of the applied electric field within the display device and the brightness of the incident light.

Of the two basic modes, a reflective mode device is the least efficient. Only a small fraction of the incident light is back scattered to the observer by reflection. It has been reported that only about 10% of the incident light is scattered away from the direction of incidence. Thus, only a small fraction of incident energy is made available for the read out display. (See U.S. Pat. No. 3,499,112).

In an attempt to increase the observed brightness of the reflective type display, the prior art has devised a second "type" of reflective mode. A reflective coating (rather than an absorptive coating) is placed on the side of the liquid crystalline substance opposite from the observer. Preferably, a collimated light source, (e.g., sunlight), is incident upon the plane of the read out display at an angle equal to or less than 45°. Incident light penetrates the plane of the display read out; it transmitted through the liquid crystalline substance; and is reflected by an equal angle from the rear reflective layer. When portions of the liquid crystalline substance are selectively excited, a fraction of the scattered light is transmitted to the rear reflective layer through a smaller angle of incidence. The light is then reflected through that smaller angle to the observer whose line of sight is positioned substantially perpendicular to the plane of the display read out. Thus, the observer observes a brightened image on a dark background. The image is formed both by the fraction of light scattered backward toward the observer from the liquid crystal material and a fraction of the scattered light reflected from the back reflective coating. (See U.S. Pat. No. 3,675,988.)

The prior art has also devised various embodiments of the transmissive mode whereby the display read out may appear as a brightened image against a darkened background rather than a dark image against a bright background as first discussed. This effect is achieved by placing a polarizing layer between the light source and the liquid crystalline substance. A second polarizing layer is positioned between the observer and the liquid crystalline substance. The light emitted from the source is plane polarized by the first polarizing layer. It is transmitted through the liquid crystalline substance. The light is then incident upon the second polarizing sheet. By orienting the axis of polarization of the second sheet perpendicularly to the axis of polarization of the first sheet, substantially all of the transmitted light may be cross-polarized and the field of illumination may be made to appear uniformly dark. When portions of the liquid crystalline substance are selectively excited, the direction of polarization of the scattered light from the excited portions of the substance is rotated by varying degrees. It is then partially transmitted through the second cross-polarizing sheet. The light incident upon the observer then appears as a brightened image upon a darkened background. (See U.S. Pat. No. 3,711,713.)

Alternatively, by orienting the optical axis of the second polarizing layer substantially parallel to the optical axis of the first polarizing layer, plane polarized light transmitted to the first polarizing layer travels through the liquid crystalline substance and the second polarizing layer with little attenuation. Accordingly, a brightly illuminated field is created. However, when portions of the liquid crystalline substance are selectively excited, the axis of the polarization of the scattered light is rotated out of the axis defined by the first polarizing layer. That portion of light which has its polarization axis rotated is substantially attenuated by the second polarizing layer. Thus, dark images are formed on a brightly illuminated background.

As further embodiments of the transmissive mode, the prior art has also used side illumination of the liquid crystalline substance. Light is transmitted along the liquid crystalline layer parallel to the plane of the display read out. An observer with a line of sight substantially perpendicular to the plane of the display read out observes a darkened background. When portions of the liquid crystalline material are selectively excited, a fraction of the light is side scattered. The images thus appear as bright images against a darkened background.

In each of the prior art embodiments discussed above, the display is designed to be illuminated either by a light source operating solely in the transmissive or reflective mode. It is possible in a device designed to operate in the transmissive mode, that an external light source could work to counteract the intended differential in image illumination by causing the display to be illuminated by reflection. For example, in devices designed to operate in the transmissive mode, where normal operation would form a dark image on a bright background, it is possible that ambient light could pass through, or be absorbed in, the liquid crystal device. A fraction of the ambient light would then be scattered by the excited regions of the liquid crystalline substance. This phenomenon would tend to form a bright image against a dark background. Thus, it would tend to wash out the images formed by the normal mode of operation of the device. What is needed than is transmissive illumination device of such configuration that reflected ambient light will tend to enhance rather than cancel the desired images.

SUMMARY OF THE INVENTION

A novel illumination panel containing a light source, such as a small incandescent bulb or light emitting diode, is affixed to the back of a liquid crystal display. The liquid crystalline layer is positioned between the observer and the illumination panel. The illumination panel is a substantially transparent layer having a coating of reflective metallization or paint on its surfaces. Light emitted from the light source is thus confined within the illumination panel and directed out of a window formed on the illumination panel. In one embodiment the reflectorized coating defines the window shape and location. Furthermore, the window has a crosshatched surface or is given a matte or rough finish such that light originating from within the illumination panel and reflected from the reflectorized coating is scattered or diffused by the surface. Any specific focus of origin is thereby obliterated. Ambient light incident upon the liquid crystalline substance and transmitted through it, is scattered by the surface or finish on the window. If the light is transmitted through the window it is then reflected by the reflectorized coating on the illumination panel back through the window and is scattered back through the liquid crystalline substance. Thus, it is a feature of the present invention that light, whether incident from the light source within the illumination panel or incident from ambient exterior sources, becomes indistinguishably diffused at the surface of the window and is directed in random directions upward through the liquid crystalline substance. Therefore, when a portion of the liquid crystalline substance is selectively excited, a fraction of the diffused light will be scattered. Dark images will thus be formed upon a bright background of diffused illumination. As a result, the display will maintain a relatively high degree of image contrast in environments having low or high levels of ambient light.

Another feature of one embodiment of the present invention is the integral placement of the light source within the illumination panel. When positioned internally, light losses associated with transmission through discontinuous media are minimized. In other words, there is no air interface at any point in the optical path between the internal light source and the window. The internal light is either embedded in or placed within a filled cavity within the illumination panel. The panel may be integrally bonded to one of the substrates of the liquid crystalline device. Therefore, the only air gap in the optical path may be one between the window and the lower substrate. This gap is necessary in order to preserve the scattering of light at the roughened surface of the window.

In summary, the subject invention comprises a liquid crystal display having a pair of substrates defining a volume with a liquid crystalline substance disposed in the volume. One of the substrates has electrodes disposed on it to permit excitation of the liquid crystalline substance. A light conductive body abuts one of the substrates to provide light conduction for illuminating the liquid crystalline substance. The light conductive body has a light source to provide illumination from the body to the liquid crystalline substance. Light is transmitted from the body through a window which has a surface either provided with a matte finish or with a repetitive pattern of planar subsurfaces, such as a crosshatching of triangular prisms.

BRIEF DESCRIPTION OF THE DRAWING

FIG. 1 is a perspective view of the illumination panel of the present invention showing the reflectorized coating, the internal light source and the matte finished window defined by the inner periphery of the reflectorized coating.

FIG. 2 is a cross-sectional view through line 2—2 of FIG. 1 showing the relative placement of the internal light source and the reflectorized layer with respect to the illumination panel. FIG. 2 also illustrates the optical path of a typical light ray originating from the internal light source and a typical path of a light ray originating from ambient sources.

FIG. 3 is a partial cross-sectional view of a liquid crystalline watch display showing the illumination panel affixed to the rear substrate of the display.

FIG. 6 is an enlarged plan view of the repetitive pattern of triangular prisms which form a grating across the surface of the window in the light conductive body.

FIG. 7 is a cross-sectional view of FIG. 6 taken through lines 7—7.

FIG. 10 is a perspective view of an embodiment having an exterior light source and a simplified reflective coating.

DESCRIPTION OF THE PREFERRED EMBODIMENT

Figure 4:
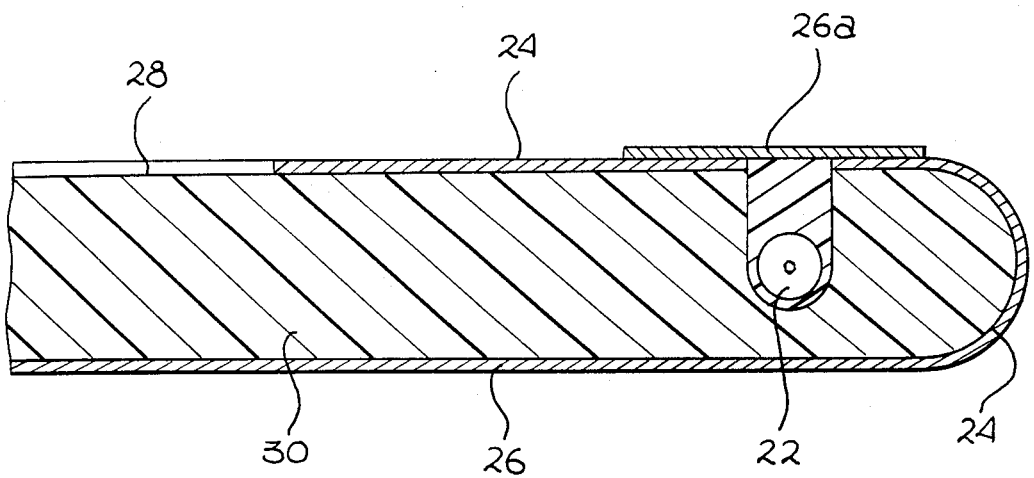
FIG. 4 is a partial cross-sectional view of the illumination panel showing the internal light source placed in a cavity in the panel which has been refilled with an optical filler.

FIG. 1 illustrates one of the embodiments of the present invention comprising an illumination panel 20 used to illuminate the read out of a liquid crystal watch display. The illumination panel 20 comprises a generally rectangular, substantially transparent, light conductive body 30 which may have one curved or rounded end. Body 30 may be fabricated from acrylic, polycarbonate or some other suitable transparent plastic. A light source 22, which may be either by a small incandescent bulb, a neon tube, or a light emitting diode, is fitted within one end of transparent body 30. By way of example, light source 22 is snugly fitted within a bore, receiving surface or cavity 21. Bore 21 is defined within the one curved end of transparent body 30 when body 30 is so configured. Light source 22 may be cemented or embedded within bore 21 by an optical filler. The purpose of the optical filler is to make the optical path between light source 22 and transparent body 30 more homogeneous. The optical filler (and any adhesive used to secure material to the body for forming surface 26) should have an index of refraction close to that of body 30. In the preferred embodiment transparent body 30 is covered with a reflectorized surface 26 disposed on its exterior surfaces. Reflectorized surface 26 may be a specular metal layer bonded to the surfaces of body 30. In the one embodiment transparent body 30 is covered with a reflectorized surface 26 disposed on its exterior surfaces. Reflectorized surface 26 may be a specular metal layer bonded to the surfaces of body 30. Reflectorized surface 26 may also be a specular metallic surface formed by means of vacuum deposition or other well known means, such as painting or reflective tape which may also be employed to secure light 22 to a receiving surface 50.

Reflectorized surface 26 may be disposed upon body 30 in such a manner as to define a window 28 on one surface of the body. The window is positioned substantially underneath the read out portion of the liquid crystal display. In the presently preferred embodiment surface 26 covers the entire surface of the body 30 with the exception of window 28. The surface of window 28 may be provided with a matte finish such that light incident upon window 28 is deiffusely reflected, or such that light originating within layer 30 is diffusely transmitted through window 28. Window 28 is provided with a matte or rough surface by suitable means either before or after the deposition of reflectorized layer 26. The matte surface of the window may be produced by using emery paper, sand blasting, etching, stamping, cutting molding a fine particle silica into the body 30, or by forming a diffuser lens therein. The window 28 may cover the entire surface of body 30.

As an example of one diffuser lens, the surface of window 28 may also be provided with a plurality of subsurfaces. The plurality of subsurfaces are organized into a repetitive pattern of planar subsurfaces which are inclined with respect to one another in order to break up the light. The subsurfaces may be organized in any repetitive pattern desired, so as to form triangular, square, rectangular, hexagonal or any combination of various geometric patterns.

Figure 8:
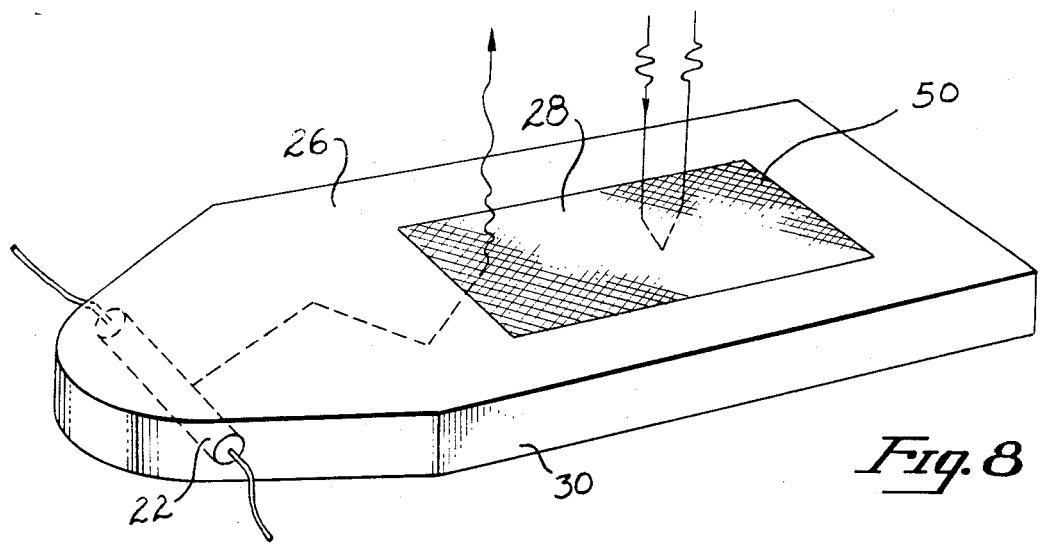
FIG. 8 is a perspective view of a light conducting body having a window surface finished with the grating illustrated in FIG. 6.

In the embodiment illustrated in FIGS. 6 through 9, the repetitive pattern is a pattern employing a multiplicity of linear, planar subsurfaces. By the term "linear, planar subsurfaces" it is meant that a repetitive pattern is constructed of smaller intersecting planar surfaces, each of which may be associated with other surfaces so as to collectively form a single linear surface. For example, the pattern illustrated in FIG. 6 is a square pattern which is formed by planar trapezoidal subsurfaces 50. Each subsurface 50 may be associated with a similar subsurface to form a linear surface 52 within the repetitive pattern. Linear surfaces 52 illustrated in FIG. 6 form two groups of parallel surfaces, each group intersecting the other at substantially right angles, to form a crosshatched pattern. Subsurfaces 50 are organized into linear surfaces 52 in such a manner that may be characterized as a first and second group of triangular prisms 54 (FIG. 7) projecting from a basal plane 56, wherein the first group of prisms intersect the second group of prisms to form a crosshatched array. Instead of projections 54, it is entirely possible that the inverse of the crosshatched pattern of FIG. 6 may be employed by substituting a trincated pyramidal cavity within basal plane 56 to form a crosshatched array of grooves. It is clear that surface of window 28 may be broken up by a plurality of subsurfaces organized in repetitive patterns having many other organizations and still obtain a substantially similar diffusion of light from light connective body 30. Many variations are possible even though the repetitive pattern may be restricted to linear, planar subsurfaces. The crosshatched pattern of FIG. 6 is illustrated as being oriented with respect to perimeter 58 of window 28 such that the linear surfaces intersect perimeter 58 at approximately 45° angles. Satisfactory diffusion is still obtained with other orientations of the crosshatched pattern with respect to perimeter 58. One group of parallel lines may be omitted thereby reducing the pattern to a simple grating. The orientation of the crosshatched pattern of FIG. 6 with respect to window 28 is best shown in FIG. 8.

Figure 9:
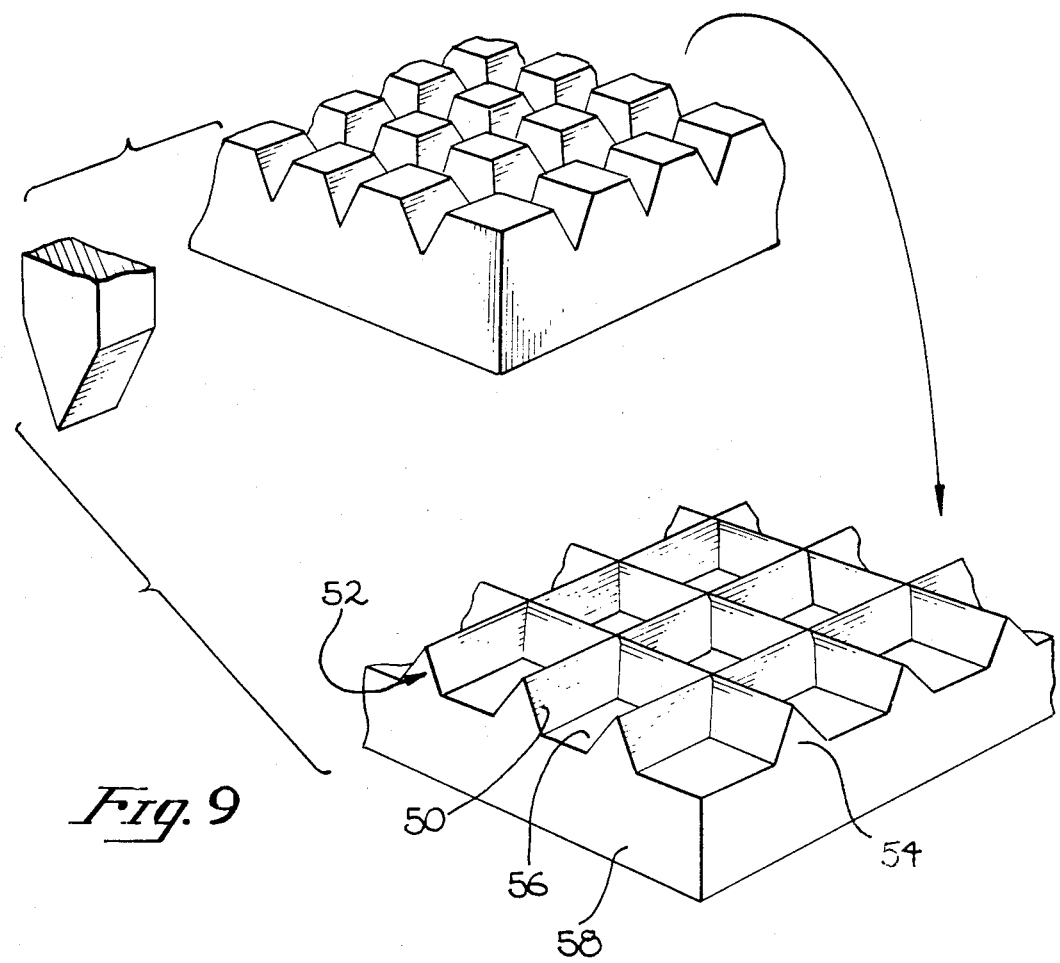
FIG. 9 is an enlarged diagrammatic view of a mold and a grating which may be made by the mold.

One of the ways in which the crosshatched pattern of FIG. 6 may be manufactured is illustrated in FIG. 9. Since the light connective body 30 is of acrylic or other similar transparent plastic, it is typically injection molded or extruded by means well known to the art. Mold or tooling 60 is therefore of material compatible with the injection molding process of acrylic or other plastic chosen for light connective body 30. Mold 60 is formed by drawing a cutter having a triangular cutting tip across the mold in a plurality of equally spaced linear traverses. The mold is then rotated 90 degrees and a second group of linear, parallel cuts is made across the mold at right angles to the first group of cuts. Thus, the mold is fabricated with a waffle-like surface over which the liquid plastic will flow and set. Typically, the cuts are equally spaced and are of equal depth. For example, the depth of cut 62 is such that the molded plastic pattern has a triangular prismatic projection 54 (FIG. 7) having a height of 0.0020± 0.0005 inches above basal plane 56. The spacing of the cuts is typically chosen such that the distance between the deepest part of one cut and an adjacent cut is 0.012±0.002 inches. Other spacings and depths may be chosen. However, the parameters indicated above may be conveniently manufactured by the means just discussed while still being fine enough to diffuse the light transmitted through window 28 into a uniformly bright field. The plastic pattern resulting from mold 60 produces a smooth, high gloss reflective finish which is free of scratches, voids and sink marks.

It is to be noted that a crosshatch array of FIG. 6 gives in many cases a superior performance to a matte finished window. Although it is not perfectly understood, a window provided with an abraded surface or matte finish tends to exhibit nonuniform illumination across its field. That portion of a matte finished window nearest light source 22 tends to be somewhat more brightly illuminated than that portion which is more distant from the light source. In addition, there appears to be a change in the color of light across a window having a matte finish. In contrast, a window provided with a crosshatched array as described above not only exhibits a brighter and more uniform illumination across the entire surface of the window, regardless of the distance from light source 22, but also causes no detectable color variation across the field.

It is to be noted that in one embodiment of the invention the curved end of body 30 is shaped to define a generally parabolic reflector 24 which tends to organize and direct light originating from internal light source 22 into body 30. Eventually the light so directed is diverted throughout window 28.

Referring now to FIG. 2 the physical operation of the one embodiment of the present invention may be better understood. A portion of illumination panel containing internal light source 22 and a portion of window 28 is illustrated. For the purposes of illustration, a light ray 32 shown originating at internal light source 22 is depicted as twice reflected from surface 26. Namely, the light ray is reflected at a point on the upper surface of body 30 and at a point on the lower surface of body 30. Ray 32 is then shown as traveling to the surface of window 28 where it is scattered and refracted into into the liquid crystal device, not shown. Also by way of example, a light ray 34, originating from external ambient sources, is shown as traveling through the upper structure of the liquid crystalline device, and being scattered and refracted at the surface of window 28 into layer 30. When in layer 30 it is reflected by surface 26 back to the surface of window 28. Ray 34 is again scattered and refracted into upper regions of the liquid crystal device, not shown.

Two features of the present invention illustrated in FIG. 2 should be noted. Firstly, lgith originating at internal light source 22 travels from that source through transparent body 30 and eventually arrives at window 28 without having been transmitted through any substantial optical discontinuity. The beneficial result of this feature is the limitation of light losses which would otherwise occur through such optical discontinuities, e.g., an air gap between layer 30 and light source 22. Secondly, the matte or crosshatched surface of window 28 serves to soften and spread the illumination provided by internal source 22 uniformly across the field of window 28. Furthermore, the matte or crosshatched surface of window 28 serves to scatter light rays which are incident upon its surface whether they be from internal source 22 or from external ambient sources. The beneficial result of this feature is to blend the light emerging from the surface of window 28 regardless of whether the light originates from internal or external light sources. Thus, regardless of the source, light from window 28 serves as an effective illumination source for the liquid crystal device, and provides a substantially uniform diffused illumination field. Light obliquely incident upon the plane of the display read out, which light might otherwise tend to form a bright image on the darkened background, is blended indistinguishably with non-obliquely incident external light and light from internal source 22. Therefore, light from any and all origins tends to form a darkened image on a brightened background.

FIG. 3 more clearly illustrates the beneficial result obtained by having an internal light source 22. Illumination panel 20 is shown as contiguous to lower substrate 40 of a liquid crystal watch display. By way of example, the liquid crystal display is shown as including two substrates 42 and 40 in combination with a spacing means 46. The substrates define a cavity containing a liquid crystalline substance 44. Upper electrodes 48 are shown disposed upon the interior surface of upper substrate 42. Likewise, lower electrodes 49 are shown disposed upon the interior surface of lower substrate 40. By means of suitable circuitry, voltages are selectively applied between electrodes 48 and 49 thereby causing a change of state in the interlying crystalline material 44. Electrodes 48 and 49 may be substantially transparent to permit the transmission of light through the excited portion of liquid crystalline substance 44. It is to be noted that in the embodiment illustrated in FIG. 3, light originating from internal source 22 may be transmitted through body 30, window 28, and lower substrate 40. The optical index of refraction of body 30 may be chosen to approach that of substrates 40 and 42. Therefore, light originating from internal source 22 passes through successive layers of the liquid crystalline display device without encountering substantial optical discontinuities. The body 30 may in fact serve both as the lower substrate of liquid crystal display device and as the illumination panel. In such a case, lower electrodes 49 may be disposed directly upon the surface of window 28. In another embodiment electrodes 48 and 49 may be entirely disposed upon the interior surface of upper substrate 42 leaving illumination panel 20 unencumbered to serve as lower substrate 40.

In the present preferred embodiment light source 22 is a thin, incandescent light powered from its own battery. The battery that is powering light source 22 is a separate battery distinct from the battery used to power the timing circuitry and watch display. A switch is provided on the watch to allow the light to be selectively and manually operated, thus the battery operating the light is not continuously in use and will, under normal use, require only infrequent replacement (once a year).

FIG. 4 illustrates a cross sectional view of another means by which internal light sources 22 may be placed within light conductive body 30. A groove may be formed within light conductive body 30 through surface 26 permitting the placement of internal light source 22. FIG. 4, by way of example only, shows a groove extending from the upper surface of light conductive body 30 to an appropriate depth. After placement of internal light source 22 the groove is then refilled with an optical filler 31. The optical parameters of filler 31 may approach or be equal to those of body 30. A specular coating 26a is then disposed over the surface of the groove in order to prevent loss of light through the opening in surface 26. Specular coating 26a may be the same material as specular coating 25, or may be of any material capable of reflecting light.

In another embodiment, as illustrated in FIG. 10, light source 22 may be disposed outside of body 30, but adjacent to one end. In particular light source 22 may be fixed within or adjacent to a receiving surface groove 70 provided at one end of body 30 by means of a piece of reflective tape or a transparent adhesive between light source 22 and receiving surface 70. The backside of body 30 is provided with a reflector 72, such as, a suitably shaped segment of reflective tape, which may be disposed across one large planar surface 74 and the end 76 of body 30 opposed to light source 22. Substantially all of the opposed large planar surface 78 is then provided with a crosshatched or matter surface and functions as window 28.

Figure 5:
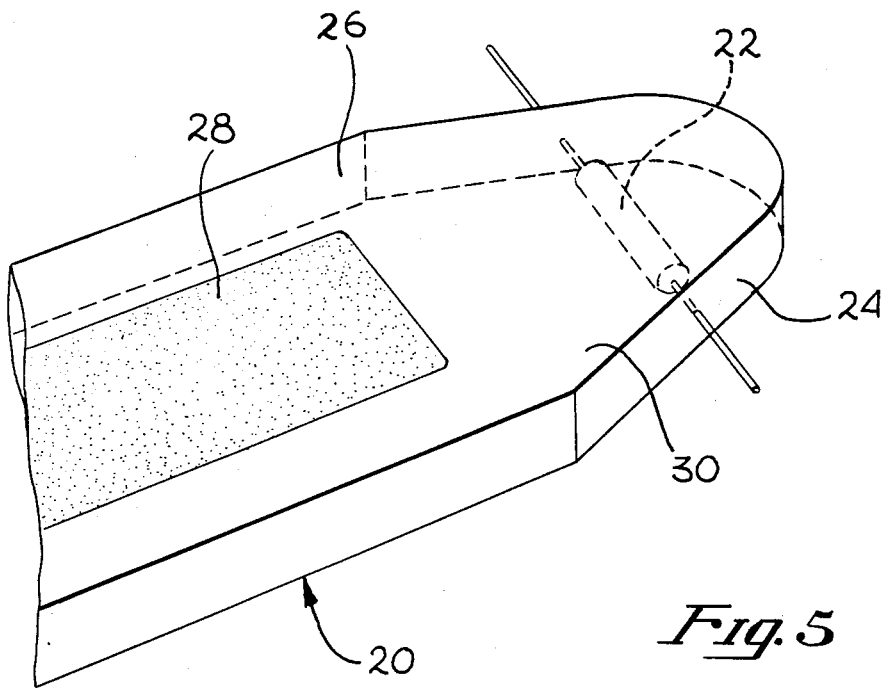
FIG. 5 is a perspective view of one end of the illumination panel illustrating an embodiment of the present invention where the internal light source is embedded in the panel.

FIG. 5 illustrates yet another embodiment of the present invention wherein internal light source 22 is integrally embedded in one end of illumination panel 20. In the embodiment of FIG. 5, internal light source 22 is in intimate contact with layer 30 by virtue of being placed within layer 30 while the illumination panel is being cast or molded. By means of the structure illustrated in FIG. 5 efficient optical coupling between internal light source 22 and optically conductive layer 30 is virtually assured.

I claim:

1. In a passive electro-optical display having a pair of substrates defining a volume, a liquid crystalline substance disposed in said volume, at least one of said substrates having electrodes disposed thereon to permit excitation of said liquid crystalline substance, the improvement comprising:

an edge lit light conductive body abutting one of said substrates to provide light conduction for illuminating said liquid crystalline substance, said light conductive body having a window with a surface formed into a plurality of subsurfaces, said plurality of subsurfaces forming a repetitive pattern of planar subsurfaces, and each subsurface being inclined with respect to at least one other subsurface of said plurality of subsurfaces;

a light source disposed adjacent to said light conductive body along an edge to provide illumination through said light conductive body generally parallel to said window and through said substrate to said liquid crystalline substance; and a specular layer disposed on said light conductive body, to reflect light from said light source incident upon said light conductive body through said window.

2. The improvement of claim 1 wherein said repetitive pattern is a pattern employing a multiplicity of linear, planar subsurfaces.

3. The improvement of claim 2 wherein said subsurfaces are a first and second group of triangular prisms projecting from a basal plane, said prisms of said first group intersecting said prisms of said second group to form a crosshatched array.

4. The improvement of claim 1 wherein said plurality of subsurfaces is a first and second group of triangular prisms projecting from a basal plane, intersecting said prisms of said second group to form a cross-hatched array.

5. The improvement of claim 4 wherein:

said crosshatched array of triangular prisms form substantially perpendicular intersections, said window has a substantially rectangular perimeter and said prisms terminate at said perimeter to form an angle of approximately 45°.

* * * * *